April 19, 1960  P. VLAHOS  2,933,009

SPEED VARIATION INDICATOR

Filed May 20, 1957

INVENTOR.
PETRO VLAHOS
BY
Attorney

United States Patent Office 2,933,009
Patented Apr. 19, 1960

2,933,009

SPEED VARIATION INDICATOR

Petro Vlahos, Los Angeles, Calif., assignor to Motion Picture Research Council, Inc., Los Angeles, Calif., a corporation of California Application May 20, 1957, Serial No. 660,260

4 Claims. (Cl. 88—14)

This invention relates to indicating methods and systems and particularly to a method of and system for indicating cyclic variations of a shaft from a certain normal constant speed.

In a motion picture camera, exposure of the film is a function of the amount of light passing through the lens to the film and the duration of the light on the film. The duration of the exposure is commonly controlled by means of a motor-driven shutter. When the shutter shaft is rotating at a non-uniform speed, resulting in a cyclic speed variation about a desired constant speed, the film frames receive less exposure when the shutter speed is high, and the frames receive more exposure when the shutter speed is low. These cyclic variations in exposure result in cyclic variations of brightness when the film is printed and projected, and such brightness variations are called "flicker." The perception of flicker is dependent upon the rate at which the brightness varies. The eye is most sensitive to flicker at the rate of approximately 8 to 10 cycles per second, and is less sensitive at higher and lower frequency rates.

The present invention is directed to an attachment to a camera to permit an operator to observe the departure of the shutter shaft from a desired uniform speed. Should the attachment indicate that the variation in speed is such that flicker would be present on the screen, the camera is stopped and the cause of the speed variation corrected. The attachment consists of a mechanically tuned filter unit consisting of a spring-mass damped system which is tuned to approximately 8 cycles per second, the flicker frequency at which the eye is most sensitive. The mechanical filter unit comprises a flywheel and spring with damping applied to the flywheel bearings.

The principal object of the invention, therefore, is to facilitate the observation of speed variations of a rotating unit.

Another object of the invention is to provide an improved indicating device for a rotating unit.

A further object of the invention is to provide a system for observing variations in speed of a rotating unit at maximum eye sensitivity.

A better understanding of this invention may be had from the following detailed description when read in connection with the accompanying drawings, in which.

Figure 1:
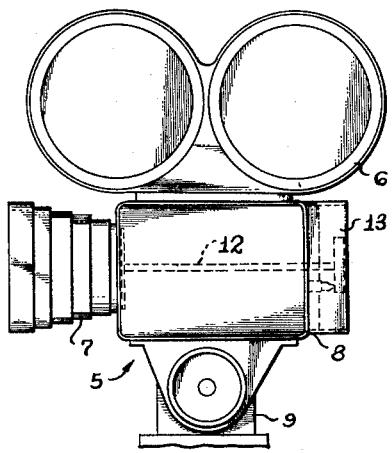
Fig. 1 is a side elevational view of a motion picture camera embodying the invention.

Referring, now, to the drawings in which the same reference numerals indicate the same elements, a motion picture camera indicated generally at 5 has a magazine 6, a lens box 7, and a housing 8 mounted on a universal head shown partially at 9. The camera 5 is of the motion picture type wherein a motor drives film advancing sprockets and an intermittent mechanism, as well as a shutter shaft 12. The present invention is embodied in a unit attached to shaft 12, the unit being positioned at the rear portion of the camera as shown at 13.

Figure 2:
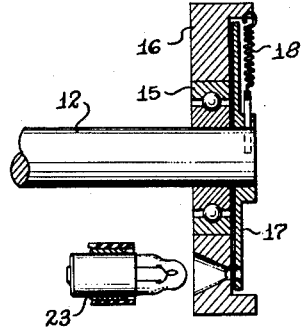
Fig. 2 is a cross-sectional view of the indicating device embodied in the camera of Fig. 1.

Referring, now, particularly to Fig. 2, the shutter shaft 12 has mounted thereon one race of a ball bearing 15 on which is mounted an undercut flywheel 16. Fixedly mounted at the rear end of the shaft is a disc 17 interconnected by a spring 18 with the overhanging edge of flywheel 16.

Although the flywheel is free to rotate independently of the disc 17, its rotation with respect to the disc 17 is limited by a pair of stops 20 on disc 17 between which is a projection 21 on flywheel 16. That is, as the disc 17 is accelerated by the motor attached to shaft 12, one of the stops 20 will be moved to the projection 21 as shown in Fig. 4 and the flywheel will be accelerated at the same speed as the disc. During this acceleration, the spring 18 will be extended to the position shown in Fig. 4. However, when the shaft 12 and disc 17 have reached a uniform speed, the tension of the spring 18 will center the projection 21 between the stops 20, as shown in Fig. 3, and both flywheel and disc will rotate at a constant uniform speed when the shaft 12 rotates at such a constant speed.

Referring, again, to Fig. 2, a light source 23 is shown positioned behind the flywheel 16. Light from the source 23 when observed will indicate the flicker, as mentioned above. Fig. 3 illustrates when the light will be observed. Holes are provided in both the flywheel 16 and the disc 17, the arrangement of the holes being in different patterns. For instance, as shown in Fig. 3, two holes shown in dotted lines 24 are provided in the flywheel 16 while a single hole 25 is provided in the disc 17. These holes may be round or rectangular, as indicated, the rectangular hole being preferred since a larger amount of light is transmitted for a certain angle of variation between the flywheel and disc.

Figure 3:
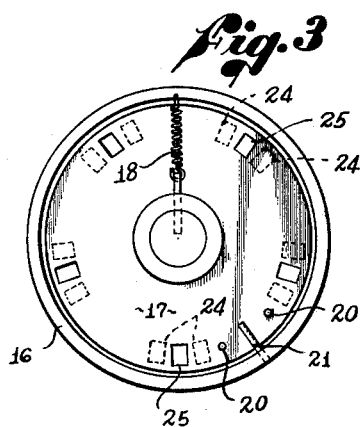
Fig. 3 is an end view of the speed variation indicator embodied in the invention in normal operating position.
Figure 4:
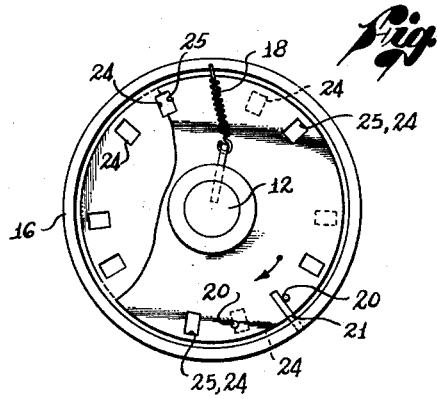
Fig. 4 is an end view of the indicating device in another position.

As shown in Fig. 3, no light is observed when the speed of the shaft 12 is constant, since neither of the holes 24 will align with the hole 25 in the disc 17. However, should the shaft 12 fluctuate, the flywheel 16 on its bearing 15 will tend to maintain its constant speed and one of the openings 24 will overlap the opening 25, depending on whether the disc speed is below or above the flywheel speed, the result being the observation of light from the source 23. By the provision of a plurality of holes 24—25 in the flywheel and disc, a more positive indication is provided. However, to increase the sensitivity, as mentioned above, the tension of the spring 18 and the mass of the flywheel 16 is so chosen that the resonant oscillation frequency will be approximately 8 cycles per second, at which the eye is most sensitive. To provide the damping element for the mechanical filter, the bearing 15 may have a heavy grease applied thereto so that the "hunting" effect is damped in a well known manner.

Although two openings are shown in the flywheel and one in the disc, it is understood that the two holes may be in the disc and one in the flywheel. Furthermore, a single opening in each element may be used, as well as cross slots. That is, the slot in the flywheel may be at an angle to the slot in the disc, the resulting indication being a radially travelling diamond of light. However, the preferred form is shown in Fig. 3.

Figure 6:
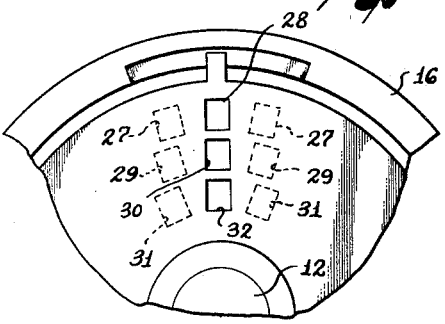
Fig. 6 is another modification of the light-indicating means shown in Figs. 3 and 4.

Another arrangement of openings is shown in Fig. 6, wherein two openings 27 in the flywheel or disc are positioned at the same radial distance from the center of the shaft 12 as an opening 28 in the disc or flywheel. At another radial distance from the center of shaft 12 is another series of openings 29 and 30, while at a third radial distance from the center of shaft 12 is a third group of openings 31 and 32. By the use of the openings at different radial distances from the center of shaft 12, a definite measure of flicker is obtainable. For instance, the group of openings 31 and 32 may indicate a flicker in excess of 4% of speed variation of the shaft 12 from normal. The group of openings 29 and 30 may indicate a threshold flicker value of 2% speed variation, and the third group of openings 27 and 28 may indicate a 1% flicker variation, which is at a rate as not to be observable when the film is projected.

Figure 5:
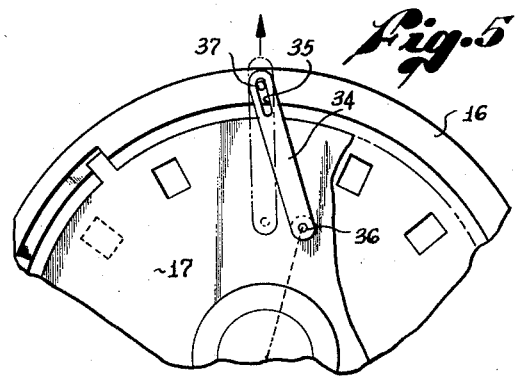
Fig. 5 is a modification of the invention shown in the prior figures.

Another modification of the spring connection between the flywheel 16 and the disc 17 is shown in Fig. 5, this modification including a link 34 having an elongated slot 35 in one end thereof. The other end of the link 34 is pivoted to the disc 17 on a pin 36, while the slot 35 accommodates a pin 37 connected to the flywheel 16. When the shaft 12 and disc 17 have reached constant speed, the centrifugal force applied to the link 34 will center the projection 21 between the stops 20 and will accomplish the same function as the spring 18 in Figs. 2, 3, and 4. The radial position of the link 34 is shown by the dotted lines 38. In practice, two diametrically opposed links 34 are preferable to maintain a static and dynamic balance of the flicker indicating unit.

In normal operation of motion picture cameras, the speed of shaft 12 is 1440 r.p.m., which exposes the film at 24 frames per second. At this speed, the natural resonance frequency of the flywheel, disc, and bearing should be approximately 8 per second. If, however, the camera is operated at double speed, or 48 frames per second, the natural resonant frequency of the indicating device should be 16 per second, and the spring-mass resonant frequency should be 4 per second if the camera is run at half normal speed. The mass and dimensions of the link 34 are selected to provide a resonant frequency of approximately 8 cycles per second when the speed of shaft 12 is 1440 r.p.m. Since the restoring force of the link is proportional to r.p.m., the natural resonant period will be raised to 16 or reduced to 4 when the camera shutter shaft speed is doubled or cut in half, respectively. This is an automatic function and does not require adjustment.

Although certain specific forms of light observing patterns to indicate the flicker variation of shaft 12 have been shown and described, it is to be understood that other arrangements of openings and the use of more than one lamp may be used to obtain various types of light variations, the important feature residing in presenting to a camera operator an indication to which the eye is particularly sensitive during projection of the film so that he may correct the trouble during photographing.

I claim:

1. A flicker indicator for a motion picture camera comprising a shaft adapted to be rotated at different constant speeds, a first member fixedly mounted on said shaft, a second member mounted for rotation with said shaft and for rotation independently of said shaft within predetermined limits, means for interconnecting said members, said members rotating in parallel planes, and a light source positioned adjacent one of said members, said members having openings therein for indicating when said members are rotating at the same speed and when said members vary in speed with respect to one another, the mass of said second member and the damping thereof interacting with said interconnecting means to provide a resonant frequency of light interruption from said light source, said means for interconnecting said members being a link element being moved by centrifugal force to align the relative positions of said openings in said members, the centrifugal force of rotation causing said link element to have sufficient restoring force on said second member to result in a resonant system having a resonant frequency to which the eye is most sensitive at normal projection speed of film exposed by said camera.

2. A flicker indicator in accordance with claim 1 in which said first-mentioned member is a disc having openings therein and said second-mentioned member is a flywheel having openings therein, said flywheel being mounted on a bearing on said shaft.

3. A flicker indicator in accordance with claim 2 in which said bearing is greased to provide the necessary degree of damping for said flywheel to correspond to the characteristic of the eye to flicker.

4. A flicker indicator for a motion picture camera comprising a shaft adapted to be rotated at different constant speeds, a first member fixedly mounted on said shaft, a second member mounted for rotation with said shaft and for rotation independently of said shaft within predetermined limits, means for interconnecting said members, said members rotating in parallel planes, and a light source positioned adjacent one of said members, said members having openings therein for indicating when said members are rotating at the same constant speed and when said members vary in speed with respect to one another, the mass of said second member and the damping thereof interacting with said interconnecting means to provide a resonant frequency of light interruption from said light source, the centrifugal force of rotation causing the link element to have sufficient restoring force on said second member to result in a linear relationship between resonant frequencies of the system and camera shaft speed.

References Cited in the file of this patent

UNITED STATES PATENTS

| 2,272,601 | Eksergian et al. | Feb. 10, 1942 |
| 2,491,240 | Ezmuda et al. | Dec. 13, 1949 |
| 2,579,349 | Vrooman | Dec. 18, 1951 |

FOREIGN PATENTS

| 218,674 | Switzerland | Apr. 16, 1942 |
| 634,117 | Great Britain | Mar. 15, 1950 |
| 637,256 | Great Britain | May 17, 1950 |
| 522,763 | Belgium | Sept. 30, 1953 |